(12) United States Patent
Palmen et al.

(10) Patent No.: US 9,517,619 B2
(45) Date of Patent: Dec. 13, 2016

(54) CONTROLLER AND METHOD FOR INDUSTRIAL PRINTING

(71) Applicant: Markem-Imaje Holding, Bourg-les-Valence (FR)

(72) Inventors: Mikael Palmen, Lindome (SE); Isak Styf, Gothenburg (SE)

(73) Assignee: Markem-Imaje Holding (FR)

( * ) Notice: Subject to any disclaimer, the term of this patent is extended or adjusted under 35 U.S.C. 154(b) by 0 days.

(21) Appl. No.: 14/775,527

(22) PCT Filed: Mar. 13, 2014

(86) PCT No.: PCT/IB2014/000886
§ 371 (c)(1),
(2) Date: Sep. 11, 2015

(87) PCT Pub. No.: WO2014/140824
PCT Pub. Date: Sep. 18, 2014

(65) Prior Publication Data
US 2016/0023458 A1  Jan. 28, 2016

Related U.S. Application Data

(60) Provisional application No. 61/778,548, filed on Mar. 13, 2013.

(51) Int. Cl.
*B41J 2/045* (2006.01)
*G06F 3/12* (2006.01)

(52) U.S. Cl.
CPC ......... *B41J 2/04501* (2013.01); *G06F 3/1204* (2013.01); *G06F 3/1241* (2013.01); *G06F 3/1281* (2013.01); *G06F 3/1282* (2013.01); *G06F 3/1244* (2013.01)

(58) Field of Classification Search
None
See application file for complete search history.

(56) References Cited

U.S. PATENT DOCUMENTS

| | | | |
|---|---|---|---|
| 6,116,716 A * | 9/2000 | Tajika | B41J 2/04563 347/19 |
| 6,184,996 B1 * | 2/2001 | Gase | G06F 3/1294 358/1.15 |
| 2006/0164444 A1 | 7/2006 | Ferguson et al. | |
| 2009/0236789 A1 | 9/2009 | Jones | |

OTHER PUBLICATIONS

International Search Report from International Publication PCT/IB2014/000886 mailed Aug. 13, 2014.

* cited by examiner

*Primary Examiner* — An Do
*Assistant Examiner* — Renee I Wilson
(74) *Attorney, Agent, or Firm* — Lerner, David, Littenberg, Krumholz & Mentlik, LLP

(57) ABSTRACT

A method and printing controller for industrial printing with the use of a plurality of print-heads for a single printing assignment are described. Printing instructions for a single printing assignment are obtained. Different portions of the single printing assignment, and associated portions of the printing instructions, are assigned among respective print-heads of a plurality of print-heads.

29 Claims, 8 Drawing Sheets

CONTROLLER AND METHOD FOR INDUSTRIAL PRINTING

CROSS-REFERENCE TO RELATED APPLICATIONS

The present application is a national phase entry under 35 U.S.C. §371 of International Application No. PCT/IB2014/000886 filed on Mar. 13, 2014, published in English, which claims the benefit of U.S. Patent Application No. 61/778,548, filed Mar. 13, 2013. The disclosures of said applications are incorporated by reference herein.

TECHNICAL FIELD

The example embodiments presented herein are directed towards a system, and corresponding method, for industrial printing utilizing a plurality of print-heads for a single printing assignment.

BACKGROUND

In an industrial printing environment, numerous printers are typically configured to simultaneously print information on various types of items. One example of an industrial printing environment may be the printing of labels on various types of packages or consumer goods. Consumer goods require a great deal of product identification (e.g., expiry dates, traceability data, etc.). The information to be printed may vary from one item to another, from one batch of similar items to another, from one site or time of manufacture to another, and/or from one type of print technology to another.

Each printing technology typically has two basic components, a print-head and a corresponding controller. The controller can be situated locally, or close to the print-head. The controller may also be remotely situated. Remote controllers may be shared or used to control several print-heads.

SUMMARY

An example of an industrial printing assignment is a package label. The package label may comprise different forms of information which may utilize different types of print technologies. For example, a time and date stamp may be provided by an ink jet printer while a bar code or image may be provided by a laser printer. The print, image, and/or formatting specifications may differ with different forms of print technologies. Thus, as different print-head technologies differ, controllers must output different data formats. For example, laser print-heads receive vector data, whereas Thermal Transfer Overprinting (TTO) and Drop On Demand (DOD) printers receive bitmap data. Typically, in industrial printing environments, either a single type of printer is employed or multiple types of printers may be employed. In the case that multiple types of printers are employed, respective portions of a single printing assignment need to be distributed among the different print-heads. Currently, such a printing assignment is performed in multiple and completely separate steps. A need exists for providing an industrial printing system which may handle such printing assignments in an efficient manner. Thus, at least one example object of some of the example embodiments presented herein may be to improve methods of printing control for industrial printing environments utilizing various types of printing technologies and/or print-heads for a single printing assignment.

Thus, at least some of the example embodiments are directed towards a method for industrial printing utilizing a plurality of print-heads for a single printing assignment. The method comprises obtaining printing instructions for the single printing assignment and analysing the printing instructions. The method further comprises assigning different portions of the single printing assignment, and associated portions of the printing instructions, among respective print-heads of the plurality of print-heads. The method also comprises sending at least one assigned printing instruction to a respective print-head. It should be appreciated that instructions may also be sent to any number of print-heads which may not necessarily perform the associated portion of the printing assignment. For example, in the case of print-head switching for load balancing purposes, assigned printing instructions may be sent to a print-head which may not perform the actual printing.

Some of the example embodiments are directed towards a computer program product comprising a computer usable medium having a computer readable program code embodied therein. The computer readable program code is adapted to be executed to implement the method for industrial printing utilizing a plurality of print-heads for a single printing assignment, as described above.

Some of the example embodiments are directed towards an industrial printing controller utilizing a plurality of print-heads for a single printing assignment. The controller comprises processing circuitry configured to obtain printing instructions for the single printing assignment. The processing circuitry is further configured to analyse said printing instructions. The processing circuitry is also configured to assign different portions of the single printing assignment, and associated portions of the printing instructions, among respective print-heads of the plurality of print-heads. The printing controller further comprises interface circuitry configured to send at least one assigned printing instruction to a respective print-head.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments.

Some example embodiments presented herein are directed towards an industrial printing controller, and corresponding method, for providing industrial printing utilizing a plurality of print-heads for a single printing assignment. Such a system may decrease the printing time required for single printing assignments.

Figure 1:
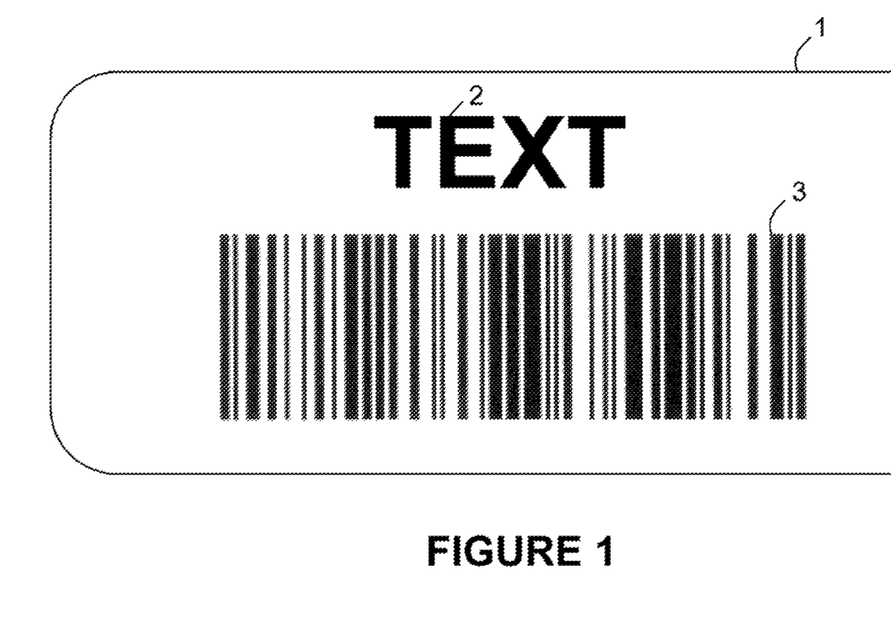
FIG. 1 is an illustrative example of a single printing assignment utilizing different types of printing technologies.

FIG. 1 is an illustrative example of a single printing assignment utilizing multiple forms of printing technologies. The example provided by FIG. 1 is a printing label 1 which may be used, for example, for shipping purposes or consumer goods. The printing label 1 comprises two distinct markings, a text image 2 and a bar code image 3. In some instances, different forms of printing technologies may be preferred to provide the different image markings of the printing assignment. For example, for a text image, a dot or ink jet printer may be utilized. For the bar code image, a laser printer may be utilized.

Typically, such a printing assignment is performed in multiple steps with different sub-systems, or controllers, of an industrial printing system being responsible for different portions of the printing assignment. Thus, a need exists to simplify the printing process of such assignments and to make the printing of these assignments more efficient.

According to some of the example embodiments, a single printing controller (e.g., a master printing controller) may be utilized to obtain printing instructions for a single printing assignment. The master printing controller may thereafter simultaneously distribute the printing instructions to different print-heads, which may or may not be associated with the master printing controller, in order to complete the printing. The printing instructions may be in a universal format thus making the instructions compatible with various forms of printing technologies.

Figure 2:
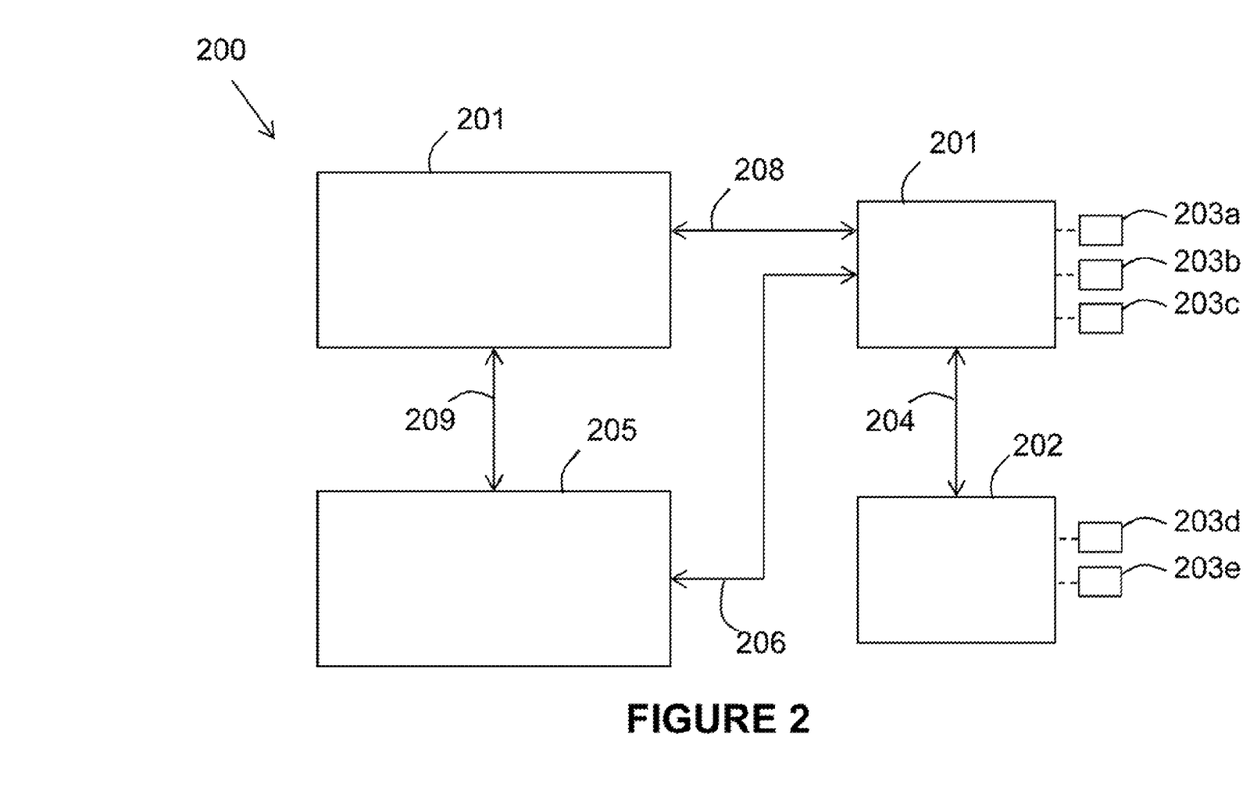
FIG. 2 is a schematic view of an industrial printing system, according to some of the example embodiments.

FIG. 2 illustrates an example industrial printing system 200 which may utilize some of the example embodiments presented herein. The industrial printing system 200 may comprise any number of printing controllers. In the example provided in FIG. 2, the system comprises two printing controllers 201 and 202. The printing controllers may be in connection with any number of print-heads. As shown in FIG. 2, print controller 201 is associated with print-heads 203a-203c and print controller 202 is associated with print-heads 203d and 203e. It should be appreciated that the print-heads may be reconfigured to print with different printing parameters, for example, resolution, coding compensation, contrast, etc. It should further be appreciated that a single printing controller may be associated with print-heads of different printing technologies. The relationship between the controllers and print-heads will be described in greater detail in FIGS. 4A and 4B.

The various printing controllers of the system 200 may be in communication with one another via any form of communication or connection means 204. It should be appreciated that at least one print controller of the system 200 may function as a master controller. The master controller may be configured to retrieve a single printing assignment and distribute different portions of the single printing assignment among different print controllers of the system 200. It should further be appreciated that the role of the master controller may be dynamic such that different printing controllers may function as the master controller at any given time. Furthermore, it should be appreciated that the printing system may feature any number of master controllers at any given time.

The industrial printing system 200 may of FIG. 2 further comprise an Enterprise Resource Planning (ERP) database 205. The ERP database is one example of an external system providing data and/or control of a production line. It should be appreciated that the database 205 may be in the form of a CoLOS database, or any image/control database, Programmable Logic Controllers (PLC), third party software or customer software applications. The ERP database 205 may be utilized for storing printing assignments which need to be performed. The ERP database 205 is in connection with at least one printing controller, for example, printing controller 201, via any form of communication or connection means 206. It should be appreciated that the ERP database 205 may be connected to any number of printing controllers of the industrial printing system 200.

In the industrial printing system 200 may further comprise a CoLOS database 207 (e.g., an image/control database). It should be appreciated that CoLOS is provided merely as an example and that any form of database comprising image and/or control data may be utilized. The database 207 may also store printing assignments which need to be performed. Furthermore, the database 207 may be utilized in an image creation procedure to create code images which may be utilized in the printing assignments. It should be appreciated that image creation may also be provided manually, for example, using a text editor or by via software, for example, a third party software.

Thus, once a printing assignment has been obtained, a printing controller may access the database 207 in order to provide printing instructions via the image creation procedure. It should be appreciated that the database 207 may be in communication with any number of printing controllers via any form of communication or connection means 208. It should further be appreciated that the database 207 and the ERP database 205 may be in communication with one another via any form of communication or connection means 209.

Figure 3:
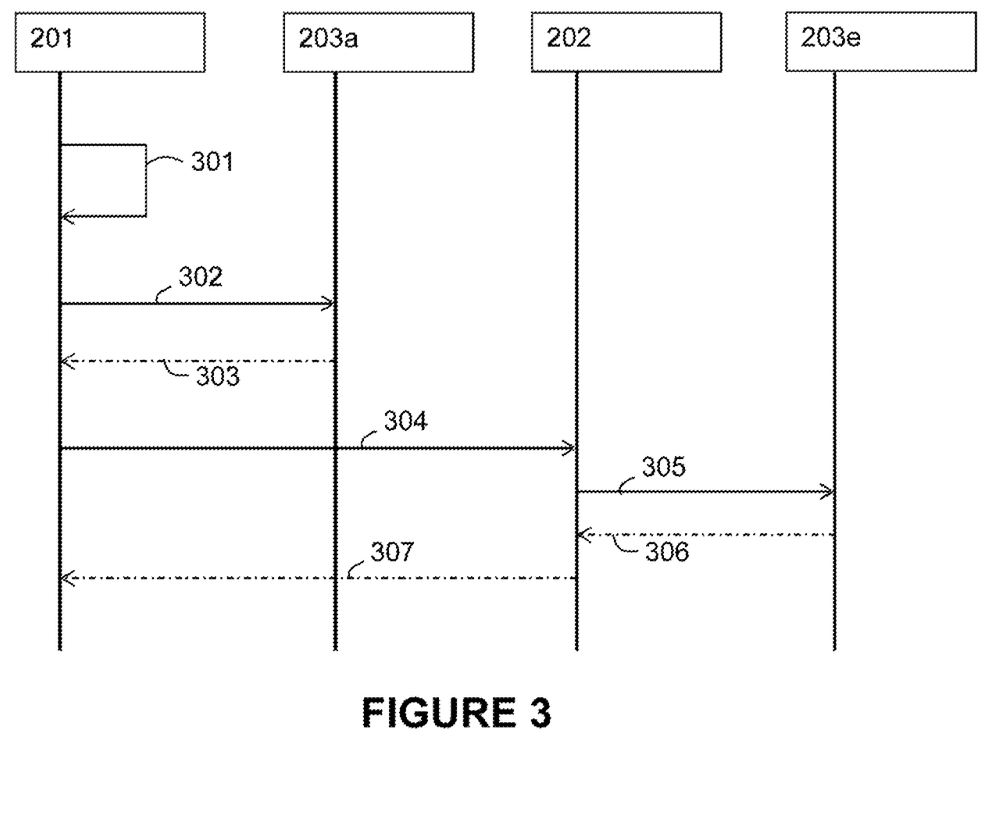
FIG. 3 is a message signaling diagram for assigning a single printing assignment, according to some of the example embodiments presented herein.

FIG. 3 illustrates a message passing diagram featuring some of the example embodiments presented herein. In operation, a controller (e.g., controller 201), which may be functioning as a master controller, obtains printing instructions for a single printing assignment (message 301). According to some of the example embodiments, the printing instructions may be obtained via an external source. Non-limiting examples of an external source may be the CoLOS or ERP databases, a network server, or any other form of database. The instructions may also be obtained by a user provided source or input. It should be appreciated that the printing instructions may be obtained from any other printing controller or element of the industrial printing system 200.

Once the printing instructions are obtained, the master controller 201 evaluates the instructions to determine the distribution of the various portions of the instructions among different printing-heads of the system 200. In evaluating the instructions, the master controller 201 may receive availability reports from different controllers of the system 200. The availability reports may provide information regarding work-loads and printing capabilities of the different print-heads of the system.

The evaluation may further be based on a preferred use weighting. For example, the single printing assignment may require different forms of printing technologies to be utilized. Different print-heads or controllers may have a preferred use weighting (or preference of use) depending on the type of printing technology or quality of print required.

Once the various portions of the single printing assignment have been assigned, the master controller 201 thereafter sends the assigned respective portions to the respective print-heads or controllers. For example, in some instances, a portion of the single printing assignment may be assigned to a print-head associated with the master controller 201. In the example provided in FIG. 3, print head 203a is assigned a portion of the single assignment. Thus, the master controller 201 sends instructions directly to the assigned print-head 203a (message 302). The assigned print-head 203a may in-turn send an acknowledgement message to the master controller that the job has been accepted (message 303). It should also be appreciated that the master controller 201 may also send all of the printing instructions associated with the single printing assignment to all controllers or print-heads of the system or those which are assigned to work on the single printing assignment.

In some instances, a portion of the single printing assignment may be assigned to a print-head associated with a different printing controller. In the example provided by FIG. 3, the master controller 201 sends a portion of the printing instructions to another controller in the system, printing controller 202 (message 304). Thereafter, the printing controller 202 evaluates the printing instructions and forwards the instructions to the assigned print head, in the example provided, print-head 203e (message 305). The assigned print-head 203e thereafter sends an acknowledgment message to the associated controller 202 (message 306). The controller 202 forwards the acknowledgment message to the master controller 201 (message 307).

Figure 4A:
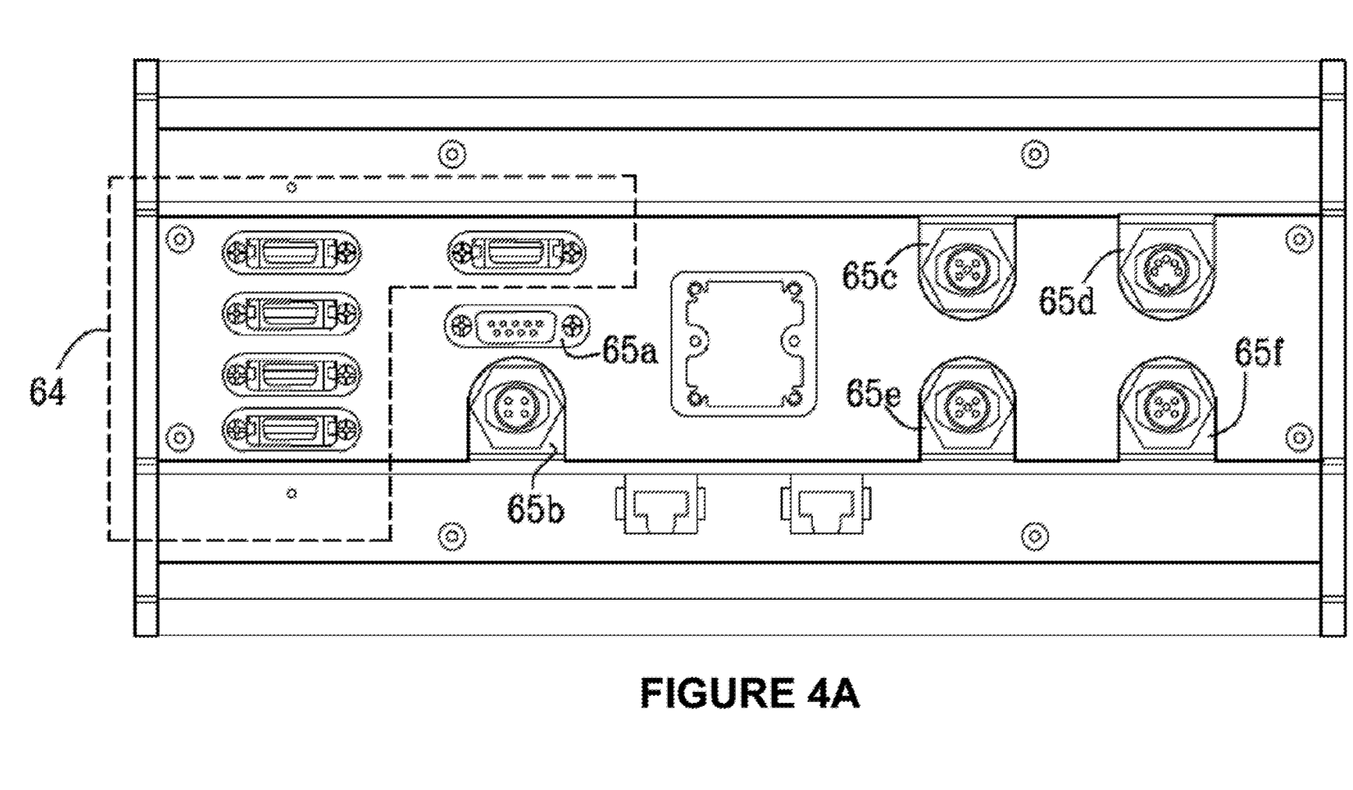
FIGS. 4A and 4B are schematic views of example multiple print-head connection ports of the controllers of FIG. 2, according to some of the example embodiments.

It should be appreciated that the printing controller may be a universal printing controller that may be configured to utilize any type of printing technology. Thus, the detection of a print-head type may be performed. FIG. 4A illustrates an example of a print-head connection port of a printing controller. The print-head connection port may feature any number of print-head connections. Any number of the print-head connections may be of a same type or shape, as illustrated by the print-head connection group 64. It should be appreciated that the print-head connectors of group 64 may be dedicated print-head connectors, which may be configured to connect with a print-head of a specific type. Thus, detection of the print-head type may be performed by determining which print-head connector is connected to a print-head.

Alternatively, the print-head connectors of group 64 may be configured to connect to any type of print-head, despite being of a same shape or type. Such print-head connectors may be referred to as universal print-head connectors. In such a configuration, print-head detection may be determined by information supplied by the print-head or by voltage analysis, which will be described in greater detail below. FIG. 4A further provides examples of print-head connectors 65a-65f of different types and shapes. It should be appreciated that any number of the print-head connectors 65a-65f may be dedicated or universal type print-head connectors.

Figure 4B:
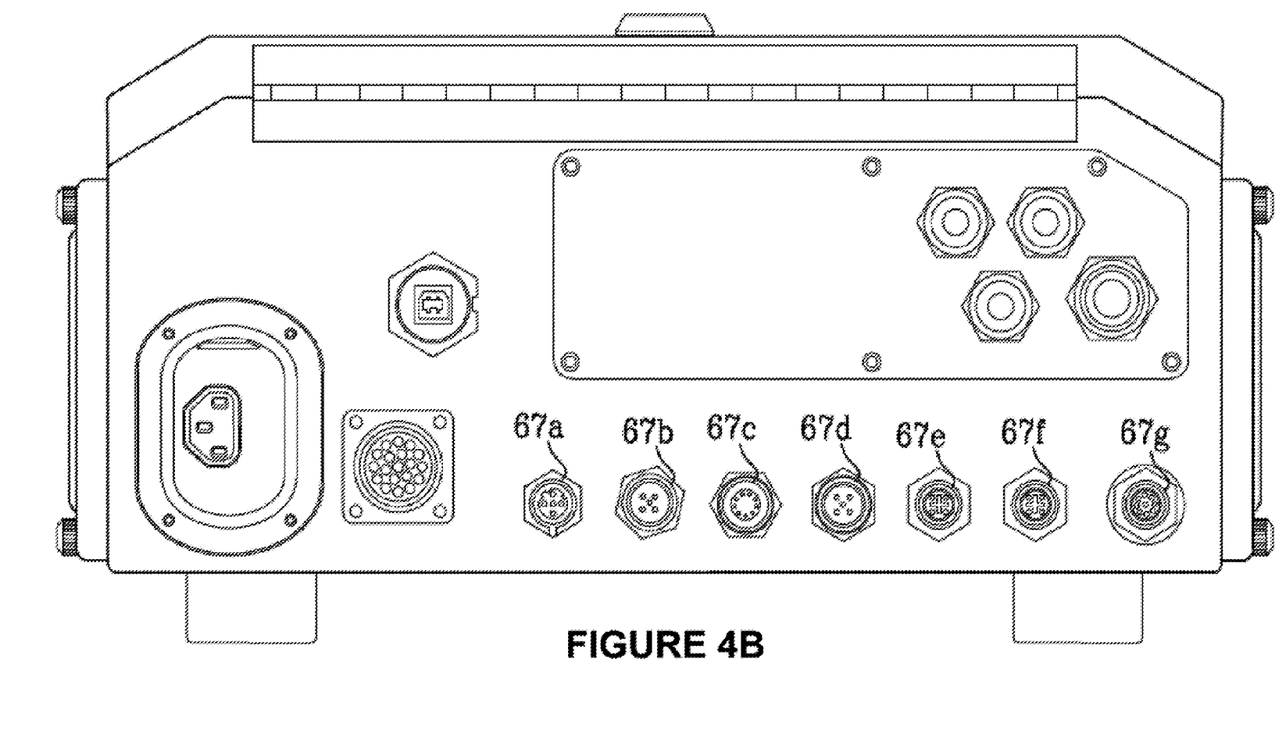

FIG. 4B provides an additional example of a print-head connection port. Any number of the print-head connectors 67a-67g may be dedicated or universal print-head connectors. It should be appreciated that the connection ports of FIGS. 4A and 4B are provided merely as examples. The connection ports may comprise any number of connectors suitable for connecting to any number of print-heads of different technologies, and may be of any dimension, shape or type.

Some of the various print technologies which may be used in conjunction with a printing controller may be, but are not limited to; vector, raster, and/or Radio Frequency Identification (RFID) type print technologies. Specifically, these technology types may comprise laser, thermal transfer, direct thermal transfer, valve jet, continuous ink jet, bubble jet, and/or piezoelectric type printers. It should be appreciated that the example embodiments presented herein may be applied to any type of printing technology. It should also be appreciated that the identification of a printing technology may be referred to herein as a print-head type configuration.

During the detection of a print-head type, a print-head is connected to the print-head connection port of the controller. Once a connection has been detected, the printing controller may determine a print-head type configuration.

In some example embodiments, the print-head type configuration may be determined by receiving the print-head type configuration from the connecting print-head. For example, the print-head connector may comprise a readable memory where instructions and identification information may be stored. Thus, upon connection, the print-head connector may transmit print-head identification information to the printing controller.

In some example embodiments, the print-head type configuration may be determined by receiving the print-head type configuration from a designated head connector. As previously discussed, at least a subset of the various connection ports of the printing controller may be designated ports. Thus, according to some example embodiments, a designated port may only be configurable to be connected to the print-head type associated with the designation. Therefore, upon detecting a connection to a designated port, the printing controller may determine the print-head type configuration of the connecting print-head.

In some example embodiments, the print-head type configuration may be determined by receiving the print-head type configuration from a user-provided source. For example, a user may provide the print-head type configuration via a user interface. In other example embodiments, the user may provide the print-head type configuration by uploading such information via a computer readable medium or a network server.

In some example embodiments, the print-head type configuration may be determined by receiving a voltage reading associated with a print-head connection. The print-head type configuration may thereafter be determined based on a value of the voltage reading. Different types of print technologies may require different amounts of power or voltage. Thus, by measuring the voltage associated with a connection print-head, the determination of the print-head type configuration may be made. It should be appreciated that the printing controller may retrieve a comparison voltage reading in the determination. It should further be appreciated that a user may program or enter respective voltage values for various print technologies in the printing controller. It should be appreciated that the methods for print-head type retrieval provided above are merely examples. Any other forms of print-head type retrieval known in the art may also be utilized. It should further be appreciated that multiple forms of print-head retrieval may be utilized at the same time to, for example, provide a check that the correct print-head type has been determined.

Figure 5:
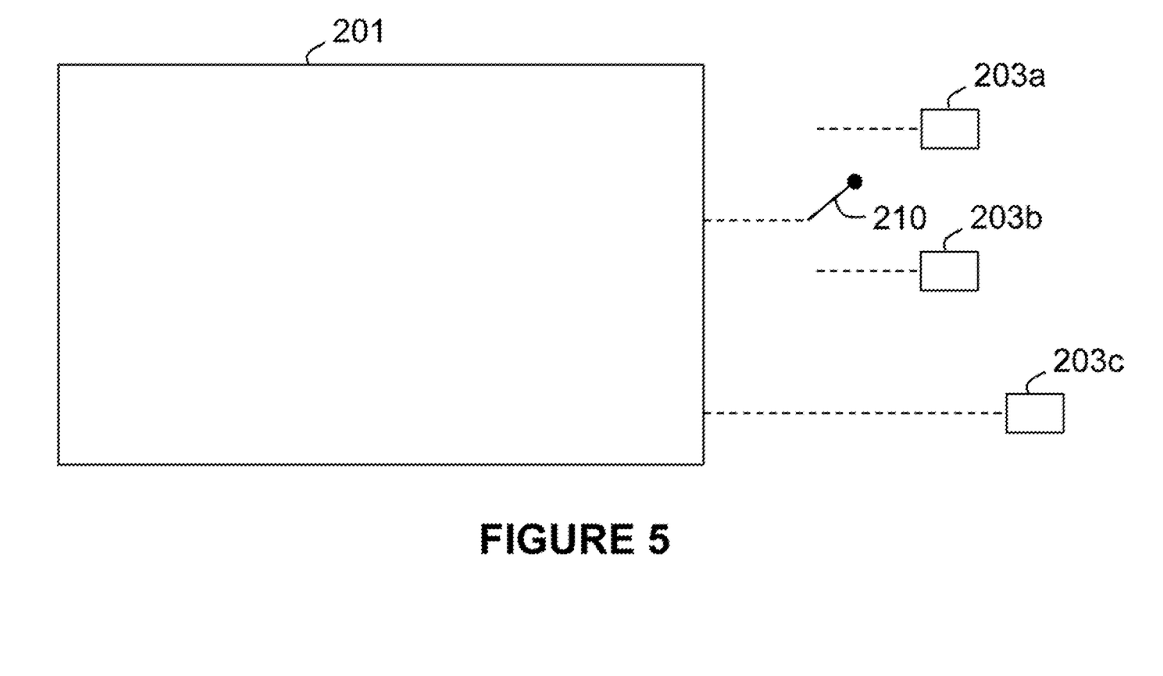
FIG. 5 is an illustrative example of a print-head switching mechanism, according to some of the example embodiments presented herein.

According to some of the example embodiments, a switching mechanism may be utilized to switch an on-going operation of the print-heads. FIG. 5 illustrates a print-head switching mechanism, according to some of the example embodiments presented herein. In the example provided by FIG. 5, the controller 201 comprising a switching mechanism between print-heads 203a and 203b such that an on-going printing assignment or operation may be switching between the two print-heads. Such switching may be provided as a result of a fault. Thus, if one of the print-heads 203a or 203b fails, the operation of the failed print-head may be switched. Such switching may be performed with minimal effect to the on-going printing assignment.

In some of the example embodiments, the switching may be performed in a pre-emptive or manual manner. In some of the example embodiments, the switching may be performed in a periodic manner (e.g., printing operations may be switched on a monthly basis). Such switching operation may prevent over-use of the print-heads. It should be appreciated that the switching may occur among print-heads utilizing a same or different printing technology. It should further be appreciated that switching may also take place among print-heads which are not associated with the same controller.

Figure 6:
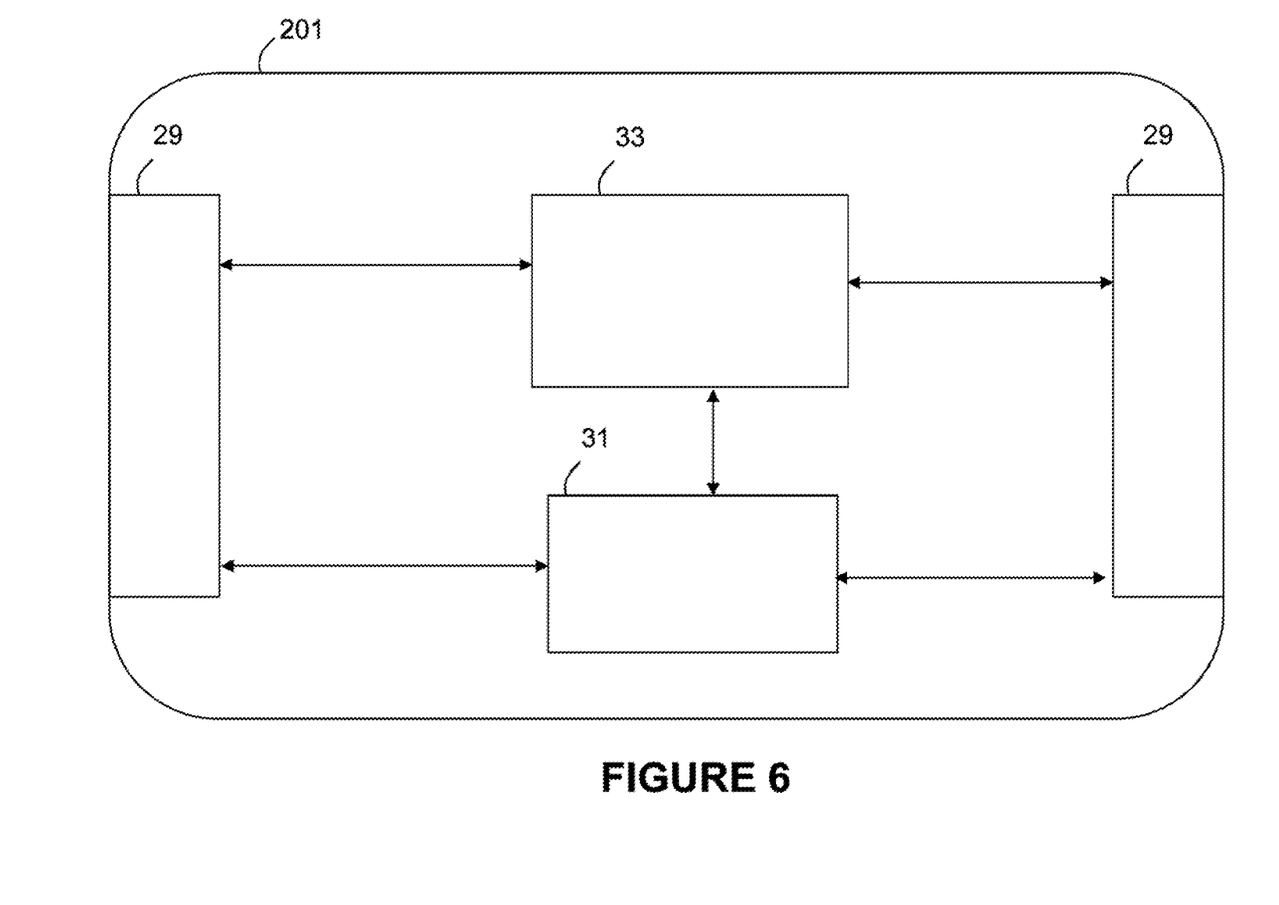
FIG. 6 is a schematic view of a print-head controller, according to some of the example embodiments presented herein.

FIG. 6 illustrates an example printing controller configuration, according to some of the example embodiments. The printing controller comprises interface circuitry 29. In FIG. 6, two distinct interface circuitry units are illustrated, however it should be appreciated that the printing controller 201 may comprise any number of interface circuitry units 29 that may be able to transmit or receive any number or type of signals, data, and/or instructions. It should be appreciated that the printing controller 201 may alternatively comprise a single transceiver unit or circuitry. It should further be appreciated that the interface circuitry 29 or transceiver unit may be in the form of any input/output communications known in the art.

The printing controller 201 of FIG. 6 also comprises at least one memory unit 31. The memory unit 31 may be configured to store received, transmitted, and/or measured data and/or executable program instructions. The memory unit 31 may be any suitable type of computer readable memory and may be of volatile and/or non-volatile type.

The printing controller 201 furthers comprise processing circuitry 33 that may be configured to analyse and distribute various portions of a single printing assignment. It should be appreciated that the processing circuitry 33 may be comprised in any number of separate units and may be any suitable type of computation unit, e.g. a microprocessor, digital signal processor (DSP), field programmable gate array (FPGA), or application specific integrated circuit (ASIC).

Figure 7:
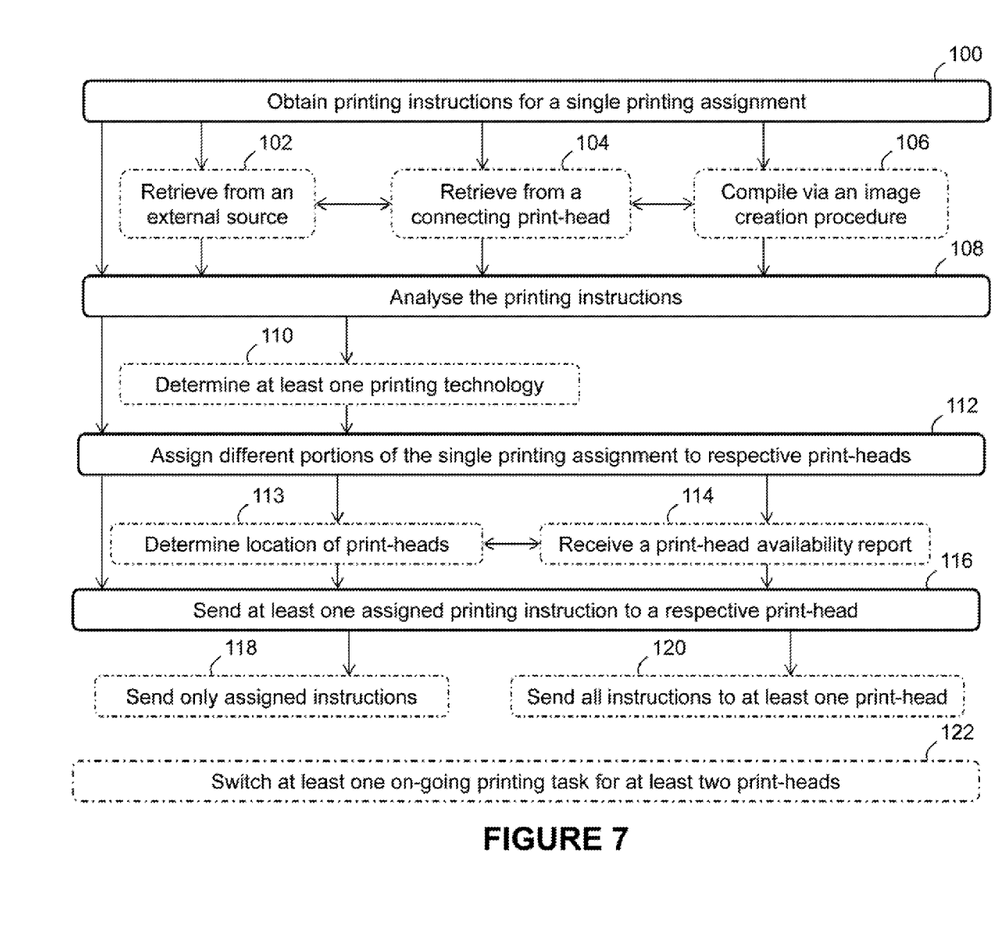
FIG. 7 is a flow diagram depicting example operations of the print-head controller of FIG. 6.

FIG. 7 is a flow diagram depicting example operations which may be taken by the printing controller of FIG. 6, according to some of the example embodiments. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 100—

The printing controller 201 is configured to obtain 100 printing instructions for the single printing assignment. The processing circuitry 33 is configured to obtain the printing instructions for the single printing assignment.

According to some of the example embodiments, the printing instructions may be in a universal format such that any print-head and controller may understand the instructions regardless of a printing technology associated with the print-head or controller. The universal format may comprise image data as well as control data. The image data may comprise information on the image to be printed while the control data may comprise instructions for printing, for example, for a switching of print-heads, load balancing, or any other printing control instructions known in the art or any of the example control operations discussed herein. It should be appreciated that once the universal format is provided, additional processing may be used to decode the universal format according to the printing technology of the respective print-head. According to some of the example embodiments, the single printing assignment may be a single printing label, for example as illustrated in FIG. 1.

Example Operation 102—

According to some of the example embodiments, the obtaining 100 may further comprise retrieving 102 the printing instructions from an external source. The processing circuitry 33 may be configured to retrieve the printing instructions from the external source.

According to some of the example embodiments, the external source may be a ERP or CoLOS database or any form of database providing image and/or control data. According to some of the example embodiments, the external source may also be a network server. It should further be appreciated that the printing instructions may also be user provided.

Example Operation 104—

According to some of the example embodiments, the obtaining 102 may further comprise retrieving 104 the printing instructions from a printing controller and/or at least one connecting print-head. The processing circuitry 33 may be configured to retrieve the printing instructions from the printing controller and/or at least one connecting print-head.

As was explained in relation to FIG. 3, according to some of the example embodiments, a printing controller may obtain printing instructions send from another printing controller. Specifically, in the example provided by FIG. 3, a master printing controller 201 forwarded printing instructions to another printing controller 202 of the industrial printing system 200.

As was explained in relation to FIGS. 4A and 4B, according to some of the example embodiments, a printing controller may also be able to obtain printing instructions form a connecting print-head. For example, the connecting print head may communication such instructions upon connection.

Example Operation 106—

According to some of the example embodiments, the obtaining 100 may further comprise compiling 106 the printing instructions for the single printing assignment with the use of an image creation procedure. The processing circuitry 33 may be configured to compile the printing instructions with the use of the image creation procedure. According to some of the example embodiments, the image creation procedure may be, for example, a CoLOS related procedure. It should be appreciated that an image creation tool and editor may be embedded in to the printer.

Operation 108—

The printing controller is further configured to analyze 108 the printing instructions. The processing circuitry 33 is configured to analyze the printing instructions.

Example Operation 110—

According to some of the example embodiments, the analyzing 108 may further comprise determining 110 at least one printing technology which is required for a respective portion of the single printing assignment. The processing circuitry 33 may be configured to determine the at least one printing technology which is required for the respective portion of the single printing assignment.

According to some of the example embodiments, the at least one print technology may be a sub-group of printing technologies which are capable of being used for the respective portion of the single printing assignment. According to some of the example embodiments, the sub-group may be an ordered listing or printing technologies with respect to a preferred use weighting. For example, in the printing label of FIG. 1, the bar code 3 may be provided the use of a laser or thermal printer. The sub-group or ordered list may comprise all of the possible print technologies which may be utilized for providing the bar code. The ordered list may be provided depending on any number of factors such as quality of the print, costs, etc. It should further be appreciated that the sub-group may be utilized in the case of a fault. For example, if a print-head fails the sub-grouping may be analyzed to determine and reassign the respective portion of the printing assignment to another print-head.

Operation 112—

The printing controller is further configured to assign 112 different portions of the single printing assignment, and associated portions of the printing instructions, among respective print-heads of the plurality of print-heads. The processing circuitry 33 is configured to assign the different portions of the single printing assignment, and associated portions of the printing instructions, among the respective print-heads of the plurality of print-heads.

According to some of the example embodiments, the assigning 112 may be based on pre-defined rules. The pre-defined rules may be based on, for example, a print-head capacity, required resolution, and/or required quality, etc.

Example Operation 113—

According to some of the example operations, the analyzing 108 and/or the determining 110 may further comprise determining 113 locations of print-heads corresponding to print technologies identified by the analyzing 108. The processing circuitry 33 may be configured to determine locations of print-heads corresponding to print technologies identified by the analyzing. According to some of the example embodiments, the print-heads may be associated with a same controller or with any number of different controllers in communication with the determining controller (e.g., the master controller).

Example Operation 114—

According to some of the example embodiments, the determining 113 may further comprise receiving 114 a print-head availability report. The print-head availability report may comprise a listing of print-heads which are associated with the at least one controller and are available for receiving printing instructions. The processing circuitry 33 may be configured to receive the print-head availability report.

It should be appreciated that such information may be comprised in a central database and/or reported to the master controller. Such reporting may be performed on a periodic bases or when a change in a current status occurs. The receiving of the print-head availability report may further be performed based on a request from the printing controller (e.g., the master printing controller).

Operation 116—

The printing controller is further configured to send 116 at least one assigned printing instruction to a respective print-head. The interface circuitry 29 is configured to send the at least one assigned printing instruction to the respective print head.

Example Operation 118—

According to some of the example embodiments, the sending 116 may further comprise sending 118 only assigned printing instructions to respective print-heads. The interface circuitry 29 is configured to send only the assigned printing instructions to respective print heads. Thus, in this example embodiment, the print-head will only receive the printing instructions for the portion of the printing assignment the print-head is responsible for completing.

Example Operation 120—

According to some of the example embodiments, the sending 116 may further comprise sending 120 all printing instructions associated with the single printing assignment to at least one print-head or controller. The interface circuitry 29 may be configured to send all of the printing instructions associated with the single printing assignment to the at least one print-head or controller.

Thus, in this example embodiment, at least one print-head or controller may have all of the printing instructions associated with the single printing assignment. This may be beneficial in the case of a print-head failure. In such an instance, the printing instructions may be redistributed more readily. It should be appreciated that any sub-set of the printing instructions may be sent to any printing controller of the industrial printing system.

Example Operation 122—

According to some of the example embodiments, the printing controller may be configured to switch 122 at least one on-going printing task for at least two print-heads of the plurality of print-heads. The processing circuitry 33 may be configured to switch at least one on-going printing task for at least two print-heads of the plurality of print-heads.

According to some of the example embodiments, the switching may be performed as a result of a fault. The switching may also be used to increase the uptake time and reduce the printing time for a print-head. According to some of the example embodiments, the switching may be performed in an automatic, pre-emptive and/or manual manner. According to some of the example embodiments, the switching may take place among at least two print-heads of a same or different printing technology type. The switching may be provided between print-heads associated with a same printing controller, as is illustrate in FIG. 5. However, it should also be appreciated that the switching may be provided among any number of print-heads comprised in the industrial printing system 200.

The various embodiments have been described using an industrial printing environment as an example. It should be appreciated that any other printing environments may utilize the example embodiments as well. For example, modern office printers are today dealing with a related but different problem in that they can have multiple input formats that are desired to be printed using a single predefined printer technology. Examples here may be vector input from a Computer Aided Design (CAD) software package that is supposed to be printed on a bitmap printer. In such a case the input data may be prepossessed to generate an internal bitmap presentation of the provided data.

The above-mentioned and described embodiments are only given as examples and should not be limiting to the present invention. Other solutions, uses, objectives, and functions within the scope of the invention as claimed in the below described patent claims should be apparent for the person skilled in the art.

Modifications and other embodiments of the disclosed invention(s) will come to mind to one skilled in the art having the benefit of the teachings present in the foregoing descriptions and the associated drawings. Therefore, it is to be understood that the invention(s) is/are not to be limited to the specific embodiments disclosed and that modifications and other embodiments are intended to be comprised within the scope of this disclosure. Although specific terms may be employed herein, they are used in a generic and descriptive sense only and not for purpose of limitation.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein are described in the general context of method steps or processes, which may be implemented in one embodiment by a computer program product, embodied in a computer-readable medium, including computer-executable instructions, such as program code, executed by computers in networked environments. A computer-readable medium may comprise removable and non-removable storage devices including, but not limited to, Read Only Memory (ROM), Random Access Memory (RAM), compact discs (CDs), digital versatile discs (DVDs), flash memory, EEPROM, etc. Generally, program modules may comprise routines, programs, objects, components, data structures, etc. that performs particular tasks or implement particular abstract data types. Computer-executable instructions, associated data structures, and program modules represent examples of program code for executing steps of the methods disclosed herein. Such instructions may be executed by the processing unit, e.g., central processing unit, microcontroller, microprocessor, field programmable gate array, application specific integrated circuit, digital signal processor, etc. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method to improve printing control for industrial printing environment utilizing a plurality of various print-head technologies and/or print head types for a single printing assignment, the method comprising:
    obtaining printing instructions for the single printing assignment;
    analysing said printing instructions;
    detecting print head technology and/or type in said industrial printing environment;
    assigning different portions of the single printing assignment, and associated portions of the printing instructions, among respective print-heads of the plurality of print-head technologies and/or print head types based on detected print head technology and/or print head type; and
    sending at least one assigned printing instruction to a respective print-head type,
    wherein the analysing further comprises determining at least one printing technology which is required for a respective portion of the single printing assignment,
    wherein the at least one printing technology is a sub-group of printing technologies capable of being used for the respective portion of the single printing assignment, and
    wherein the sub-group is an ordered listing of printing-technologies with respect to a preferred use weighting.

2. The method of claim 1, wherein the printing instructions are in a universal printing format.

3. The method of claim 1, wherein the obtaining printing instructions further comprises retrieving said printing instructions from an external source.

4. The method of claim 3, wherein the external source is CoLOS or an Enterprise Resource Planning (ERP) database, or a network server.

5. The method of claim 1, wherein said printing instructions are user-provided.

6. The method of claim 1, wherein the obtaining printing instructions further comprises one or more of:
    retrieving said printing instructions from a printing controller and/or at least one connecting print-head, and
    compiling the printing instructions for the single printing assignment with the use of an image creation procedure.

7. The method of claim 1, wherein the assigning further comprises determining locations of print-heads corresponding to printing technologies identified by the analysing.

8. The method of claim 7, wherein the print-heads are associated with one or more of:
    a same controller, and
    at least two controllers which are in direct communication with one another.

9. The method of claim 8, further comprising receiving a print-head availability report from at least one controller, said print-head availability report comprising a listing of print-heads associated with the at least one controller and available for receiving printing instructions.

10. The method of claim 9, wherein the receiving is performed based on at least one of a request, a periodic update, and a change of status update.

11. The method of claim 1, wherein the assigning is based on pre-defined rules, said pre-defined rules being based on at least one of a print-head capacity, a required resolution, and a required quality.

12. The method of claim 1, wherein the sending further comprises one or more of:
    sending only assigned printing instructions to respective print-heads, and
    sending all printing instructions associated with single printing assignment to at least one print-head.

13. The method of claim 1, further comprising switching at least one on-going printing task for at least two print-heads of the plurality of print-heads.

14. The method of claim 13, wherein the switching is performed as a result of a fault or in at least one of an automatic, a pre-emptive and a manual manner.

15. The method of claim 1, wherein the plurality of print-heads is of a same printing technology type.

16. The method of claim 1, wherein at least two of the plurality of print-heads is of a different printing technology type.

17. The method of claim 1, wherein the single printing assignment is a single label.

18. An industrial printing controller in an industrial printing environment configured to utilize a plurality of various print-head technologies and/or print head types for a single printing assignment, the controller comprising:
- processing circuitry configured to obtain printing instructions for the single printing assignment;
- the processing circuitry further configured to analyse said printing instructions;
- the processing circuitry further configured to detect print head technology and/or print head types in said industrial printing environment;
- the processing circuitry also configured to assign different portions of the single printing assignment, and associated portions of the printing instructions, among respective print-heads of the plurality of print-head technologies and/or print head types based in said print head technology and/or print head type; and
- interface circuitry configured to send at least one assigned printing instruction to a respective print-head,
- wherein the processing circuitry is further configured to:
  - retrieve said printing instructions from a printing controller and/or at least one connecting print-head to obtain the printing instructions;
  - compile the printing instructions for the single printing assignment with the use of an image creation procedure to obtain the printing instructions; or
  - determine at least one printing technology which is required for a respective portion of the single printing assignment to analyse the printing instructions,
- wherein the at least one printing technology is a sub-group of printing technologies which are capable of being used for the respective portion of the single printing assignment, and
- wherein the sub-group is an ordered listing of printing-technologies with respect to a preferred use weighting.

19. The controller of claim 18, wherein the printing instructions are in a universal printing format.

20. The controller of claim 18, wherein the processing circuitry is further configured retrieve said printing instructions from an external source.

21. The controller of claim 20, wherein the external source is CoLOS or an Enterprise Resource Planning (ERP) database, or a network server.

22. The controller of claim 18, wherein said printing instructions are user-provided.

23. The controller of claim 18, wherein the processing circuitry is further configured to execute one or more of:
- assign the different portions of the single printing assignment based on pre-defined rules, said pre-defined rules being based on print-head capacity, required resolution, and/or required quality,
- send only assigned printing instructions to respective print-heads,
- send all printing instructions associated with single printing assignment to at least one print-head,
- switch at least one on-going printing task for at least two print-heads of the plurality of print-heads,
- switch the at least one on-going printing task as a result of a fault,
- switch the at least one on-going task in an automatic, pre-emptive and/or manual manner, and
- determine locations of print-heads corresponding to printing technologies identified by the analysis of the printing instructions.

24. The controller of claim 23, wherein the print-heads are associated with one or more of:
- a same controller; and
- at least two controllers in direct communication with one another.

25. The controller of claim 23, wherein the processing circuitry is further configured to receive one or more of:
- a print-head availability report from at least one controller, said print-head availability report comprising a listing of print-heads which are associated with the at least one controller and are available for receiving printing instructions, and
- the print-head availability report based on a request, a periodic update, and/or a change of status update.

26. The controller of claim 18, wherein the plurality of print-heads is of a same printing technology type.

27. The controller of claim 18, wherein at least two of the plurality of print-heads is of a different printing technology type.

28. The controller of claim 18, wherein the single printing assignment is a single label.

29. A computer program product, comprising a non-transitory computer usable medium having a computer readable program code embodied therein, said computer readable program code adapted to be executed to implement a method for improving printer controller for industrial printing environment utilizing a plurality of various print-head technologies and/or print head types for a single printing assignment, said method comprising:
- obtaining printing instructions for the single printing assignment;
- analysing said printing instructions;
- detecting print head technology and/or print head type in said industrial printing environment;
- assigning different portions of the single printing assignment, and associated portions of the printing instructions, among respective print-heads of the plurality of print-head technologies and/or print head types based on said detected print head technology and/or print head type; and
- sending at least one assigned printing instruction to a respective print-head,
- wherein the analysing further comprises determining at least one printing technology which is required for a respective portion of the single printing assignment,
- wherein the at least one printing technology is a sub-group of printing technologies capable of being used for the respective portion of the single printing assignment, and
- wherein the sub-group is an ordered listing of printing-technologies with respect to a preferred use weighting.

* * * * *